United States Patent

Cornetet, Jr.

[15] 3,644,826
[45] Feb. 22, 1972

[54] MOISTURE-MEASURING SYSTEM USING MICROWAVE AND NUCLEONIC MEASUREMENTS

[72] Inventor: Wendell H. Cornetet, Jr., Columbus, Ohio
[73] Assignee: Industrial Nucleonics Corporation
[22] Filed: Apr. 3, 1967
[21] Appl. No.: 628,066

[52] U.S. Cl. .................................... 324/58.5, 250/83.3
[51] Int. Cl. .......................................... G01r 27/04
[58] Field of Search ............... 324/58, 58.5; 250/83.3 D

[56] References Cited

UNITED STATES PATENTS

| | | | |
|---|---|---|---|
| 2,659,860 | 11/1953 | Breazeale | 324/58.5 A |
| 2,797,388 | 6/1957 | Maybury et al. | 324/58.5 A |
| 2,888,643 | 5/1959 | Summerhayes, Jr. | 324/82 |
| 3,068,398 | 12/1962 | Schoolery et al. | 324/0.5 A |
| 3,265,873 | 8/1966 | Sawyer | 324/58.5 A |
| 2,937,280 | 5/1960 | Gilman | 250/83.3 |
| 3,278,841 | 10/1966 | Hanson et al. | 324/58.5 |
| 3,361,964 | 1/1968 | Hanson et al. | 324/61 |

OTHER PUBLICATIONS

Zehnder, C. B. " Microwave- Gamma Ray Gauge Measures Chip Weight and Moisture" in Paper Trade Journal. Feb. 6, 1967. TS 1080. P26. pp. 48– 49.

Hewlett- Packard Journal, Vol. 16, No. 6, Feb. 1965 pgs. 3 & 4.

Primary Examiner—Edward E. Kubasiewicz
Attorney—Marechal, Biebel, French and Bugg and William T. Fryer, III

[57] ABSTRACT

A system for the measurement of the percentage of moisture content of flowable bulk material online using microwave and nucleonic measurements, in which a microwave system has transmitting and receiving antennas and a readout system connected to the receiving antenna to measure the attenuation of the microwave signal including a third antenna to pick up scattered microwave energy to apply to the microwave readout a correction in accordance with the level of the scattered energy, the accuracy of readout being maintained by a PIN diode modulator in the output of the receiving antenna with a bias control loop for maintaining a constant output with the bias signal applied to the PIN diode representing moisture content of the material following correction in accordance with the scattered energy, and in which variations in mass are corrected by a nucleonic mass measuring gauge with its rays being aligned in intersecting relation with the microwave energy at the material being measured.

9 Claims, 2 Drawing Figures

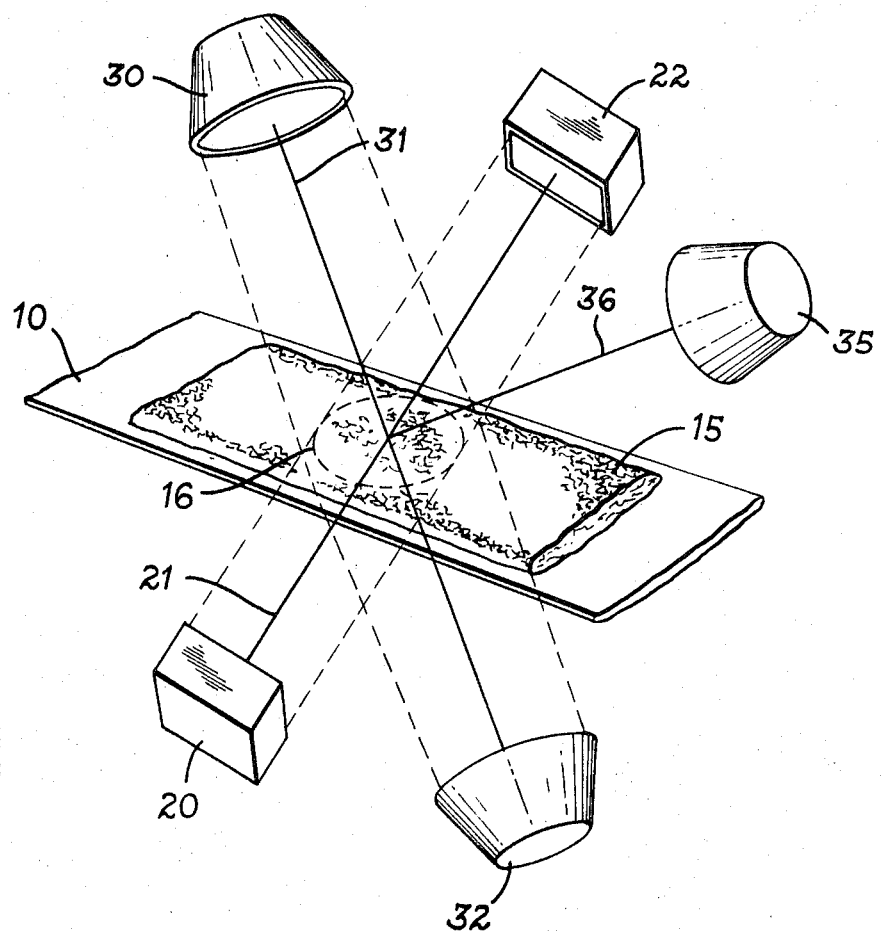

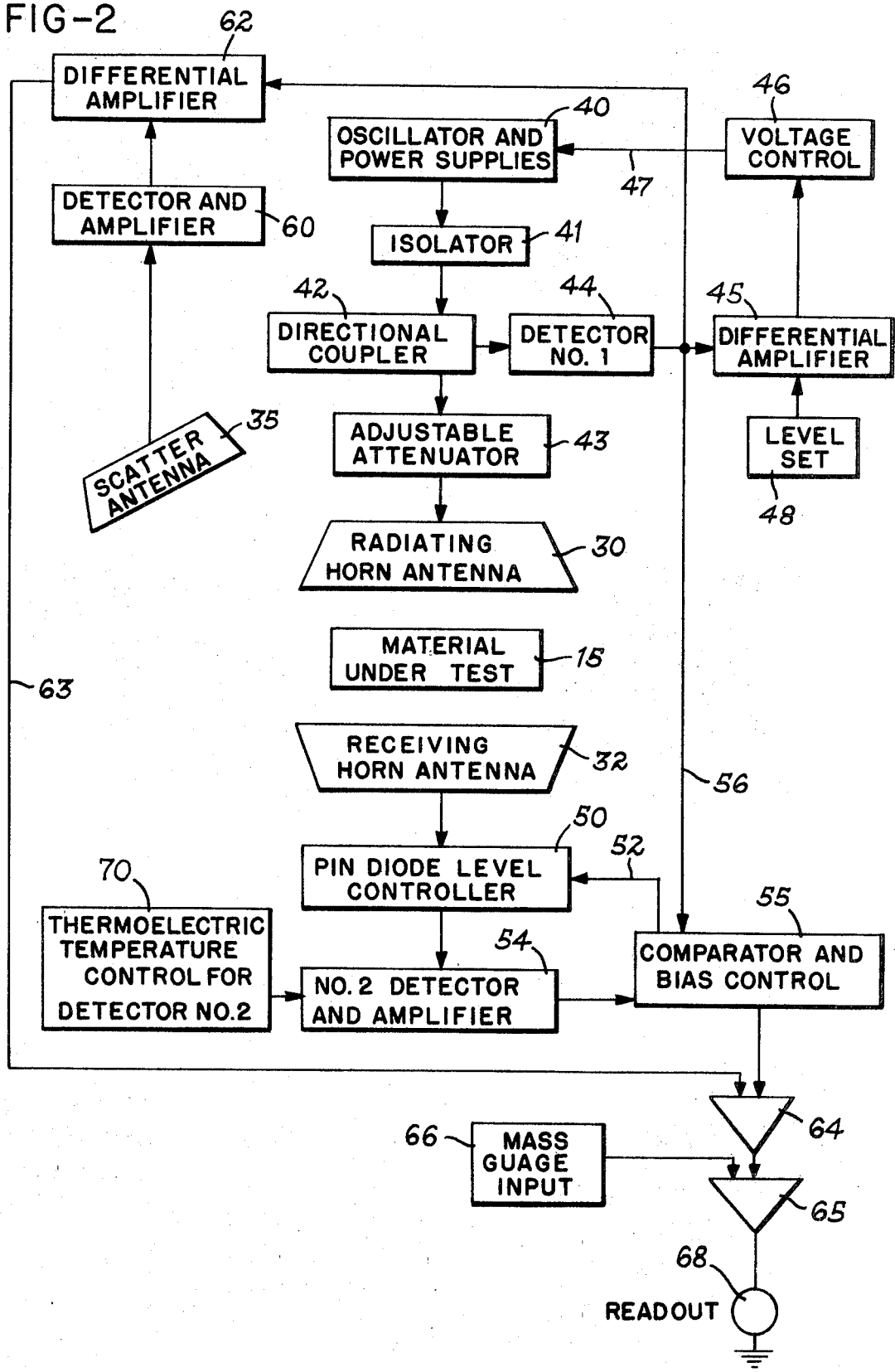

MOISTURE-MEASURING SYSTEM USING MICROWAVE AND NUCLEONIC MEASUREMENTS

BACKGROUND OF THE INVENTION

The amount of water expressed in percentage of weight of bulk material, such as tobacco, cotton, flour, grain, and the like, has been a matter of interest for a considerable period of time, and various systems have been proposed, including microwave systems in which the attenuation of a microwave signal is determined as a function of moisture content. It is known that there is a linear relation between electromagnetic energy absorption and water content, which may be expressed in grams of water per square centimeter of incidence face, for many inorganic materials. The slope of the line representing this relationship varies with the wave length of the electromagnetic energy, but it was not affected appreciably by soluble salts. Also, attenuation decreases with increasing wave length.

In the U.S. pending application of Evans and Cornetet, Jr., Ser. No. 556,224, filed June 8, 1966, there is disclosed and claimed microwave systems for measuring the moisture content in a web or sheet of dielectric material, such as paper, but the techniques and apparatus disclosed and claimed in that application do not necessarily lend themselves readily to the measurement of moisture content in loose, bulk materials, such as flour, grain, tobacco and the like.

There are several advantages of using microwaves in measuring moisture content in flowable materials. No contact with material under test is necessary. Thus, continuous measurements are possible without contamination or destruction of material. Also, measurements may be made through a relatively large area or sample of the material, and minimum control of the material is necessary as to density, arrangement on or in the conveying apparatus, or depth and width of the material under test.

SUMMARY OF THE INVENTION

The moisture-measuring system of the present invention utilizes a microwave-signal-generating system, which forms a microwave signal at a substantially constant level, applied to a transmitting antenna. The antenna may be of the simple type such as an electromagnetic horn. A receiving antenna is also employed to receive the microwave energy transmitted by the transmitting antenna, which energy will be attenuated due in part to absorption by moisture within the material.

The energy which is scattered by the material and therefore lost to the receiving antenna, if not measured and accounted for, would be indicated by the receiving system as moisture absorption. The effect of scatter cannot readily be accounted for as a constant in flowable bulk material die to the differences in scatter at the interface between the energy and the material caused by such randomly arranged material. Thus, the amount of scatter may vary with the type of material being tested and with the density and arrangement of the material under observation. In flowable bulk materials, it may be expected that scatter will vary with time. Thus, this invention utilizes a second receiving antenna which is positioned with respect to the material under test to receive a portion of the scattered energy therefrom, and the detected output of the second antenna is applied as a correction to the readout.

It has been found that increased accuracy and reliability in readout can be achieved by the use of a PIN diode modulator connected in shunt relation to the receiving antenna so that a reasonably constant power level to the output detector and amplifier can be maintained. In this manner, the output detector and amplifier can be operated at a constant level, thus with a minimum of error. PIN diode limiters have a wide dynamic range and are suitable for this purpose. A control loop is employed for biasing the PIN diode modulator to maintain the output constant, and the level of bias, following correction by the signal from the scatter-receiving antenna, may be calibrated directly in percentage of moisture content.

In systems where the bulk of the mass of material under measurement is subject to variations, a nucleonic type of mass measuring gauge is employed with its radiation axis inclined to that of the microwave axis so as to intersect the bulk material at a common area. The detected signal from the radiation gauge, indicative of the mass of the material under test, may also be applied as a correction factor to the readout.

It is accordingly an important object of the present invention to provide an online moisture-measuring system utilizing microwaves with correction for scatter of the microwave energy at its interface with the material under test.

Another important object of this invention is the provision, in a microwave moisture measuring system, of a PIN diode limiter in a control circuit in which the output thereof is maintained constant and the level of bias is utilized as an indication of moisture content.

A further object of this invention is the provision of a microwave system for the measurement of the moisture content online in flowable bulk materials in which a nucleonic gauge, such as one using an isotope source, is positioned, with respect to the microwave system, to measure the mass of the material at the same time that the material is being subject to microwave moisture measurement, to apply a mass correction which is directly related to the moisture content being measured, without the necessity of further correction due to time delay or spacing between the mass measurement and the moisture measurement stations.

More specifically, it is an object of the present invention to provide a moisture-measuring system, as outlined above, in which the nucleonic gauge ray is directed through flowable bulk material, online, in angular intersecting relation to the microwave energy at such material, together with a readout system in which the affects of variations in the mass of the material under test may be eliminated providing a direct indication of the percentage of moisture content.

These and other objects and advantages of the present invention will be apparent from the following description, the accompanying drawings and the appended claims.

BRIEF DESCRIPTION OF THE DRAWINGS

FIG. 1 is a perspective and somewhat diagrammatic view of a moisture measuring system constructed according to this invention; and FIG. 2 is a block diagram of the invention.

DESCRIPTION OF PREFERRED EMBODIMENT

Referring to the figures of the drawing which illustrate a preferred embodiment of the invention, a nonmetalic conveyor is illustrated generally at 10 in FIG. 1 for transporting bulk material 15, the moisture content of which is to be measured by this system. The carrier, of course, may be a closed conduit. The material 15 may be, and usually is, a flowable bulk material such as grain, tobacco, or other loosely packed, moisture-containing product which may be carried on a conveyor 10 or otherwise transported.

The material 15 is carried by the conveyor 10 through a measuring station at which the moisture content of the material, as it passes through this station, will be measured in an online condition. The measuring station is indicated generally at 16 in FIG. 1 and is defined as the region of intersection of the mass-measuring ray and the microwave energy. Thus, as shown in FIG. 1, means for constantly measuring the mass of the material 15, the moisture content of which is to be measured, includes a radiation source 20 positioned to direct radiation therefrom, as generally indicated by the axis 21, through the material 15, and is collected by a detector 22. The detector 22 functions as a high resistance whose impedance varies as an inverse function of the intensity of the received radiation, and could be an ionization chamber, or other known means, dependent upon the source being used.

The mass responsive gauge consisting of the source 20 and detector 22 is preferably of the penetrative radiation type wherein a source of beta, gamma, bremsstrahlung or other type radiation is used to irradiate the material to be measured and a radiation detector such as a scintillation detector or an ionization chamber is used to determine the amount of radiation passing through the material. The choice of radiation depends on the density of the material being measured. Whereas a useful detector response results from the use of beta or bremsstrahlung radiation for lightweight materials, there would be substantially no absorption of a more penetrating radiation such as gamma. Alternatively, it is desirable to use a gamma source when one measures a relatively dense material. Strontium 90 and Krypton 85 are examples of beta emitters and Americium 241 and Cesium 137 are suitable gamma emitters. Irrespective of the weight range of the material, the radiation detector signal is combined with the microwave detector signal to provide an output signal directly proportional to percent moisture.

The output of the detector 22 may be applied to a suitable computer balancer and a standardizing circuit, the output providing a voltage indicative of the mass of the material 15 generally at the zone or region 16 of intersection. The axis 21 of the radiation gauge is preferably inclined slightly to the perpendicular with respect to the conveyor 10, and may, as shown in FIG. 1, be inclined slightly in the direction of travel and transverse to the direction of travel in order to provide physical space for the positioning of the microwave transmitting and receiving components.

For highest accuracy, it is desirable to maintain a fairly constant mass of material 15 flowing through or in the measurement station 16, to reduce error due to nonlinearity of the measurement system. However, by reason of the employment of the radiation gauge, it is not necessary to maintain the mass of such material precisely constant.

The microwave system includes a transmitting antenna 30 which is preferably of the simple electromagnetic horn type for directing radiant energy along an inclined axis 31 through the material 15 at the zone 16 to a first microwave receiving antenna 32. Thus, the antenna 32 is positioned relative to the transmitting antenna 30 to receive the attenuated transmitted microwave energy passing through the material 15 and the support or conveyor 10. As shown in FIG. 1, the axis 31 of the microwave-measuring system is inclined with respect to that of the radiation gauge for the purpose of providing space for the physical placement of the parts of the system. Accordingly, the axis 31 may also be inclined slightly from the perpendicular with respect to the direction of travel and transversely of the direction of travel, and the antennas 30 and 32 are so positioned that the transmitted microwave energy intersects the material 15 substantially at the same area as that intersected by the radiation-measuring equipment, defining the zone 16.

The effect of energy scatter at the interface between the transmitting antenna energy and the test material, in many cases, may be significant. Furthermore, the scatter patterns and amount may vary during the operation of the instrument, due to variations in the random pattern of the material 15. The energy lost by scattering at such interface would appear at the output as added attenuation in the absence of means for detecting, measuring scatter and correcting the output in accordance with the measured level of scattered energy. For this purpose, a third microwave-receiving antenna 35 is employed by an angle to the axis 31, preferably with its axis 36 forming the same angle with the base or conveyor 10 as that formed by the axis 31, and on the same side of the material 15, in a region of maximum scattered energy. The actual positioning of the antenna 35 is not critical, and for any given installation a position may be found at which such scattered energy may be measured corresponding roughly along a line of maximum reflection.

A typical circuit diagram for the apparatus of FIG. 1 is shown in FIG. 2. The circuit of FIG. 2 includes means for applying a substantially constant microwave energy to the transmitting antenna 30. This may include an oscillator 40. The frequency and output of the oscillator 40 will depend upon the type and amount of material under test. For example, a smaller amount of material may require or necessitate a higher frequency, while lower output may be satisfactory. Typical frequencies may lie in the range of 6 to 16 GHz. An oscillator 40 output level of approximately 200 milliwatts is satisfactory, in most cases, again depending upon the amount of material under test.

The output of the oscillator is applied through an isolator 41 and a direction coupler 42, through an adjustable attenuator 43 to the antenna 30. A portion of the output is taken off by a detector 44 and applied to a differential amplifier 45 and a voltage control circuit 46, the output of which is applied to a line 47 to control the level of the oscillator 40. The output of the oscillator 40 may thus be varied according to the setting of a level set control 48 having an input into the amplifier 45. In this manner, a substantially constant and regulated output level is applied to the antenna 30.

The adjustable attenuator 43 is initially set for the necessary power level for the material under test. If temperature causes any appreciable variation in this attenuator, this can be included in the level control loop. The level set potentiometer 48 permits further control over the output power and allows adjustment of the dynamic range of control. Any change in detected signal at the detector 44 is compared with the level set voltage by the amplifier 45 and causes a change in oscillator 40 output to correct for the detected change.

Circuit means connected to the receiving antenna 32 for providing an electric signal proportional to the energy received therefrom includes a PIN diode modulator 50 forming a part of a constant output level control loop. The diode 50 is connected in shunt across the output of the receiving antenna 32 and forms an output modulator of wide dynamic range.

The diode modulator 50 includes PIN diodes consisting of P-type material, an intrinsic layer of material, and N-type material, and the modulator 50 may contain a number of such diodes mounted as shunt elements mounted across the transmission line. A suitable PIN diode modulator for the modulator 50 may be the type 8734A of Hewlitt-Packard Corporation, 1501 Page Mill Road, Palo Alto, California. When DC forward bias is applied, such as by the input line 52, modulator resistance goes down. Thus, the diodes in the modulator 50 act as a variable impedance device shunting the transmission line, with their impedance and degree of attenuation being a function of the modulating signal applied on line 52.

The output of the modulator 50 is relatively constant and is applied to a detector and amplifier 54 and then to a comparator and bias control circuit 55. The comparator circuit 55 has an input on line 56 from the detector 44 forming a reference level in accordance with that of the transmitted energy, and provides a modulating bias signal on line 52 to the modulator 50 to maintain a constant input into the detector and amplifier 54 over variations in the microwave signal received by the antenna 32. Accordingly, the bias signal 52 varies as a function of moisture content and is more accurately a direct indication of total attenuation. Also, the level set 48 may be adjusted to obtain a desired output. Adding test material 15 attenuates the received signal, the detector output decreases, and the comparator and bias control 55 causes a change in bias on the PIN modulator 50 so that the detected signal at the detector 54 is brought to the original level. Thus this change in bias level represents moisture content of the sample under test. It is then corrected by the changes in scattered energy at the amplifier 64, and is further modified by the input from the radiation gauge at the differential amplifier 65, to provide a signal of the percent of moisture in the sample under test.

It is accordingly seen that this invention provides a relatively low-cost and accurate microwave system for the online measurement of the percent of moisture in flowable bulk materials. The employment of the constant level output circuit and the PIN diode modulators provides a highly accurate and reliable readout. The employment of the scatter antenna 35 permits correlation and correction to be made for the loss of signal due to the scatter of microwave energy from the interface of the material 35 with the transmitted microwave energy. In the absence of such correction as applied by this invention, this loss of energy would be measured as attenuation at the receiving antenna and would result in an erroneous indication of percent of moisture.

Means for providing a signal proportional to the scattered energy includes a detector and amplifier 60 connected to receive the signal from the scatter antenna 35 and apply it to a differential amplifier 62, which also has a reference level input connected to the output of the detector 44. The output of the amplifier 62 is a signal proportional to the amount of energy scattered by the material 15. This signal is applied from the amplifier 62 on lead Field 63 to a differential ratio amplifier 64 which combines the bias signal of the modulator 50 with the signal proportional to the scatter from the antenna 35.

The output of the differential amplifier 64 may be applied to a further such differential amplifier 65 into which the output of the mass measuring gauge is applied on a lead 66, to make correction for variations in mass. The combined output may thus be applied to a readout means 68, providing a readout of the percentage of moisture. Thus, while it is not necessary to control the exact amount of material passing through the moisture area, large changes in mass may call for a rather wide dynamic range in the measuring system. The output can be applied for direct reading to a meter 68, or may be used for automatic control of moisture in a closed-loop control.

If the detector and amplifier 54 are unduly temperature sensitive, correction may be applied by a thermoelectric control detector 70 to provide a controlled environment by correcting for changes in ambient temperature.

In the operation of the system, with no material between the radiating antenna 30 and the receiving antenna 32, the comparator and bias control unit 55 is adjusted for reference output at zero percent moisture.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A microwave moisture-measuring system for online measurement of moisture in flowable bulk material, comprising means defining a measuring station through which said material is moved for measurement, a nucleonic ray type of mass-measuring instrument at said station having its measuring ray positioned to intersect said material at said station and providing a signal proportional to the mass of such material, a source of microwave energy, a microwave-transmitting antenna connected to said source and positioned to direct microwave energy through said material at said station so that the material at said station is subject to nucleonic and microwave measurement, a receiving antenna positioned to receive energy from said transmitting antenna attenuated by moisture in the material at said station, first circuit means connected to said receiving antenna including a PIN diode modulator connected in shunt relation across the output of said receiving antenna providing an electric signal proportional to the energy received therefrom representing the loss of microwave signal due to absorption of moisture by said material, detector and amplifier means connected to receive said electric signal, comparator means connected to receive the output of said detector and amplifier means and providing a bias signal to said modulator for maintaining the output thereof substantially constant over variations in moisture content of said material, and signal combining means combining said mass proportional signal and the output of said detector and amplifier means providing a direct indication of percentage of moisture content of the material at said station.

2. A microwave moisture-measuring system for online measurement of moisture in flowable bulk material, comprising means defining a measuring station through which said material is moved for measurement, a nucleonic ray type of mass measuring instrument at said station having its measuring ray positioned to intersect said material at said station and providing a signal proportional to the mass of such material, a source of microwave energy, a microwave transmitting antenna connected to said source and positioned to direct microwave energy through said material at said station, a first receiving antenna positioned to receive transmitting energy from said transmitting antenna passing through said material, a second receiving antenna positioned to receive microwave energy scattered from said material, first circuit means connected to said first receiving antenna providing an electric signal proportional to the energy received therefrom, second circuit means connected to said second antenna providing an electrical signal proportional to the scattered microwave energy first, signal combining means for combining the signals of said first and second circuit means providing a corrected signal of microwave attenuation representing the loss of microwave signal due to absorption of moisture by said material, and second signal combining means combining said mass proportional signal and said corrected signal providing a direct indication of percentage of moisture content of said material at said station.

3. The system of claim 2 in which said material at said station moves along a generally rectilinear path, and in which said nucleonic mass-measuring instrument and said microwave antennas are positioned so that the nucleonic ray and radiated microwave energy are directed along paths which are mutually inclined to each other and which mutually intersect each other and said material at said station to subject said material to simultaneous microwave and nucleonic measurement.

4. The system of claim 2 in which said first circuit means includes a PIN diode modulator connected in shunt relation across the output of said first receiving antenna, detector and amplifier means connected to receive the signal passes through said modulator, and comparator means connected to receive the output of said detector and amplifier means and providing a bias signal to said modulator for maintaining the output thereof substantially constant over variations in moisture content of said material, and in which the output of said first circuit means comprises a signal proportional to said bias signal.

5. A microwave system for measuring the moisture content in a sample of dielectric material, comprising means generating a microwave signal at a substantially constant level, a transmitting antenna positioned to direct microwave energy from said generating means through said sample, a receiving antenna positioned with respect to said material to receive a signal therethrough from said transmitting antenna which is attenuated by absorption due to moisture in said sample, a PIN diode modulator connected in shunt relation across the output of said receiving antenna, detector and amplifier means connected to receive the signal passed through said modulator, comparator means referenced to said microwave generator means connected to receive the output of said amplifier means and providing a bias signal to said modulator for maintaining the output of said modulator substantially constant over variations in said moisture content, and read out means responsive to the level of bias signal as a function of the moisture content of said material.

6. The system of claim 5 further comprising a second receiving antenna positioned with respect to said material for receiving microwave energy scattered therefrom, detector and amplifier means connected to said second antenna and having its output connected to said readout means for correcting the readout thereof in accordance with the level of scattered microwave energy.

7. The system of claim 5 further comprising nucleonic measuring means positioned to direct radiation in intersecting relation to said microwave energy at said material, means connected to said measuring means providing a signal responsive to the mass of said material, and difference amplifier means at said readout means connected to receive said mass signal and said bias signal for correcting said readout in accordance with variations in mass of said material.

8. The system of claim 7 in which the axis of said radiation and the path of said microwave energy are mutually offset to intersect said material at somewhat different angles providing for the adjacent placement of the said antennas and said nucleonic measuring means.

9. A microwave moisture-measuring system for online measurement of moisture in flowable bulk material, comprising means defining a measuring station in which said material is positioned for measurement, a nucleonic ray type of mass measuring instrument at said station having its measuring ray positioned to intersect said material at said station and providing a first signal proportional to the mass of such material, a source of microwave energy, a microwave transmitting antenna connected to said source and positioned to direct microwave energy through said material at said station so that the same material at said station is subject to nucleonic and microwave measurement, first antenna means for receiving energy from said transmitting antenna attenuated by moisture in the material at said station to provide a second signal proportional to the moisture in said material, means for combining said first and second signals to provide an indication of percentage of moisture content of the material at said station, and second receiving antenna means positioned adjacent said transmitting antenna to receive microwave energy scattered by said material including conduit means providing an electrical signal proportional to the microwave energy scattered by said material and being connected to said signal combining means providing a corrected signal of microwave attenuation representing the true loss of microwave signal due to absorption thereof by said material.

* * * * *